(12) United States Patent
Kapur

(10) Patent No.: US 9,940,608 B2
(45) Date of Patent: Apr. 10, 2018

(54) REAL TIME EFT NETWORK-BASED PERSON-TO-PERSON TRANSACTIONS

(71) Applicant: Shashi Kapur, Fort Lauderdale, FL (US)

(72) Inventor: Shashi Kapur, Fort Lauderdale, FL (US)

(73) Assignee: MTS Holdings, Inc., Purchase, NY (US)

(*) Notice: Subject to any disclaimer, the term of this patent is extended or adjusted under 35 U.S.C. 154(b) by 203 days.

(21) Appl. No.: 13/895,725

(22) Filed: May 16, 2013

(65) Prior Publication Data

US 2014/0344150 A1    Nov. 20, 2014

(51) Int. Cl.
   *G06Q 40/00*   (2012.01)
   *G06Q 20/10*   (2012.01)
   *G06Q 20/22*   (2012.01)

(52) U.S. Cl.
   CPC ........... *G06Q 20/10* (2013.01); *G06Q 20/223* (2013.01)

(58) Field of Classification Search
   CPC .............................. G06Q 20/10; G06Q 20/223
   USPC ..................................................... 705/35–40
   See application file for complete search history.

(56) References Cited

U.S. PATENT DOCUMENTS

| | | | |
|---|---|---|---|
| 5,357,563 A | 10/1994 | Hamilton et al. | |
| 5,920,847 A | 7/1999 | Kolling et al. | |
| 6,751,299 B1 | 6/2004 | Brown et al. | |
| 6,769,605 B1 * | 8/2004 | Magness | 235/379 |
| 7,089,214 B2 | 8/2006 | Wang | |
| 7,349,884 B1 | 3/2008 | Odom et al. | |
| 7,415,442 B1 * | 8/2008 | Battaglini | G06Q 20/10 235/380 |
| 8,429,075 B2 * | 4/2013 | Smith | G06Q 20/105 705/35 |

(Continued)

FOREIGN PATENT DOCUMENTS

| CA | 2399608 A1 * | 8/2001 | ............. G06Q 20/02 |
|---|---|---|---|
| CA | 2542988 | 10/2007 | |

(Continued)

OTHER PUBLICATIONS

Anonymous: "Banks turn to debit to drive fund transfers", Bank Network News; Mar. 16, 2000; 18, 20 (Year: 2000).*

(Continued)

*Primary Examiner* — Edward J Baird
(74) *Attorney, Agent, or Firm* — Toering Patents PLLC

(57) ABSTRACT

A system and method for processing person-to-person transactions using EFT (Electronic Funds Transfer) networks in real time is provided. The system may include an adaptive payment server including one or more processors configured to receive first identification information and second identification information from a sender communication device. The adaptive payment server may receive third identification information from a receiver communication device. The adaptive payment server may determine a sender account based on the first identification information. The adaptive payment server may determine a receiver account based on the third identification information. The adaptive payment server may process a person-to-person transaction based on the sender account and the receiver account via an EFT network.

11 Claims, 5 Drawing Sheets

(56) References Cited

U.S. PATENT DOCUMENTS

| | | | |
|---|---|---|---|
| 8,620,809 B2* | 12/2013 | Battaglini | G06Q 20/10 705/38 |
| 2002/0032649 A1 | 3/2002 | Selvarajan | |
| 2002/0055904 A1 | 5/2002 | Mon | |
| 2002/0069165 A1 | 6/2002 | O'Neil | |
| 2002/0073024 A1 | 6/2002 | Gilchrist | |
| 2002/0169966 A1 | 11/2002 | Nyman et al. | |
| 2003/0046094 A1 | 3/2003 | Singh et al. | |
| 2004/0054632 A1 | 3/2004 | Remy | |
| 2004/0254868 A1 | 12/2004 | Kirkland et al. | |
| 2005/0015345 A1 | 1/2005 | Yao et al. | |
| 2005/0256806 A1 | 11/2005 | Tien et al. | |
| 2005/0289052 A1* | 12/2005 | Wankmueller | 705/40 |
| 2006/0271496 A1 | 11/2006 | Balasubramanian et al. | |
| 2006/0287965 A1* | 12/2006 | Bajan | G06Q 20/02 705/75 |
| 2007/0107017 A1 | 5/2007 | Angel et al. | |
| 2007/0107044 A1 | 5/2007 | Yuen et al. | |
| 2007/0117618 A1 | 5/2007 | Walker et al. | |
| 2007/0124242 A1* | 5/2007 | Reis, Jr. | G06Q 20/10 705/39 |
| 2007/0220275 A1 | 9/2007 | Heitzberg et al. | |
| 2007/0226495 A1 | 9/2007 | Kim et al. | |
| 2007/0255662 A1* | 11/2007 | Tumminaro | 705/79 |
| 2007/0265064 A1 | 11/2007 | Kessman et al. | |
| 2007/0295803 A1* | 12/2007 | Levine | G06Q 20/04 235/379 |
| 2008/0086770 A1 | 4/2008 | Kulkarni et al. | |
| 2008/0120214 A1 | 5/2008 | Steele et al. | |
| 2008/0130842 A1 | 6/2008 | Johri et al. | |
| 2008/0133390 A1 | 6/2008 | Scipioni | |
| 2008/0317220 A1 | 12/2008 | Perkins et al. | |
| 2009/0178120 A1 | 7/2009 | Royyuru et al. | |
| 2009/0300745 A1 | 12/2009 | Dispensa | |
| 2010/0057623 A1 | 3/2010 | Kapur et al. | |
| 2010/0070414 A1* | 3/2010 | Call et al. | 705/44 |
| 2010/0250955 A1 | 9/2010 | Trevithick et al. | |
| 2011/0208600 A1* | 8/2011 | Aharoni | G06Q 20/20 705/16 |
| 2012/0028609 A1* | 2/2012 | Hruska | G06Q 20/3674 455/411 |
| 2012/0142403 A1 | 6/2012 | Prather et al. | |
| 2012/0209762 A1* | 8/2012 | Metaireau et al. | 705/39 |
| 2012/0223133 A1 | 9/2012 | Miller et al. | |
| 2012/0246075 A1* | 9/2012 | Rasti | H04L 63/0421 705/44 |
| 2012/0323762 A1* | 12/2012 | Kapur | G06Q 20/10 705/39 |
| 2014/0032414 A1* | 1/2014 | Beisner | G06Q 20/382 705/44 |

FOREIGN PATENT DOCUMENTS

| | | | |
|---|---|---|---|
| EP | 1615183 | 1/2006 | |
| EP | 1755062 | 2/2007 | |
| EP | 2034432 | 3/2009 | |
| WO | WO 2004/049621 | 6/2004 | |
| WO | WO-2007033055 A2 * | 3/2007 | G06Q 30/02 |
| WO | WO 2010/140876 | 12/2010 | |

OTHER PUBLICATIONS

International search report dated Sep. 17, 2012 issued in related PCT application (No. PCT/US2012/042188).

Written Opinon of the International Searching Authority dated Sep. 17, 2012 issued in related PCT application (No. PCT/US2012/042188).

* cited by examiner

US 9,940,608 B2

REAL TIME EFT NETWORK-BASED PERSON-TO-PERSON TRANSACTIONS

FIELD OF THE INVENTION

The invention relates to processing person-to-person transactions. In particular, the invention relates to processing person-to-person transactions using EFT (Electronic Funds Transfer) networks in real time.

BACKGROUND OF THE INVENTION

Current person-to-person transactions experience delays in the processing of funds transfer between a sender and a receiver. The person-to-person transactions rely on overnight ACH (Automated Clearing House) funding to accomplish funds transfer between the sender and the receiver which results in delays.

Existing systems suffer from these and other problems.

SUMMARY OF THE INVENTION

According to various implementations of the invention, various systems and methods may address these and other drawbacks of existing systems. Various systems and methods may process person-to-person transactions using EFT (Electronic Funds Transfer) networks in real time.

In some implementations, the system may include an adaptive payment server including one or more processors configured to receive first identification information from a sender communication device via a first communication channel. The adaptive payment server may initiate a communication to the sender communication device via a second communication channel. The adaptive payment server may receive second identification information from the sender communication device via the second communication channel. The adaptive payment server may receive third identification information from a receiver communication device. The adaptive payment server may determine a sender account based on the first identification information. The adaptive payment server may determine a receiver account based on the third identification information. The adaptive payment server may process a person-to-person transaction based on the sender account and the receiver account via an EFT network.

Other objects and advantages of the invention will be apparent to those skilled in the art based on the following drawings and detailed description.

DETAILED DESCRIPTION

According to various implementations of the invention, various systems and methods may facilitate processing of person-to-person transactions in real time. According to various implementations of the invention, a person-to-person transaction may include a funds transfer between a sender (i.e., a person who initiates a transfer of funds) and a receiver (i.e., a person who receives funds sent by the sender) and more specifically, between the sender's account (also referred to herein as a "sender account") and the receiver's account (also referred to herein as a "receiver account." In some implementations, a person-to-person transaction may include, for instance, a funds transfer (for example, Electronic Funds Transfer ("EFT"), which involves electronically transferring funds or money from one financial account to another), and/or other transaction that transfers money to/from a financial account. In some implementations, an adaptive payment server may receive an indication of an amount of funds to be transferred from the sender account to the receiver account and may cause the funds transfer to take place via an EFT network in real time. The transactions for any of the foregoing implementations may be accomplished via one or more communication devices as will be discussed below.

Figure 1:
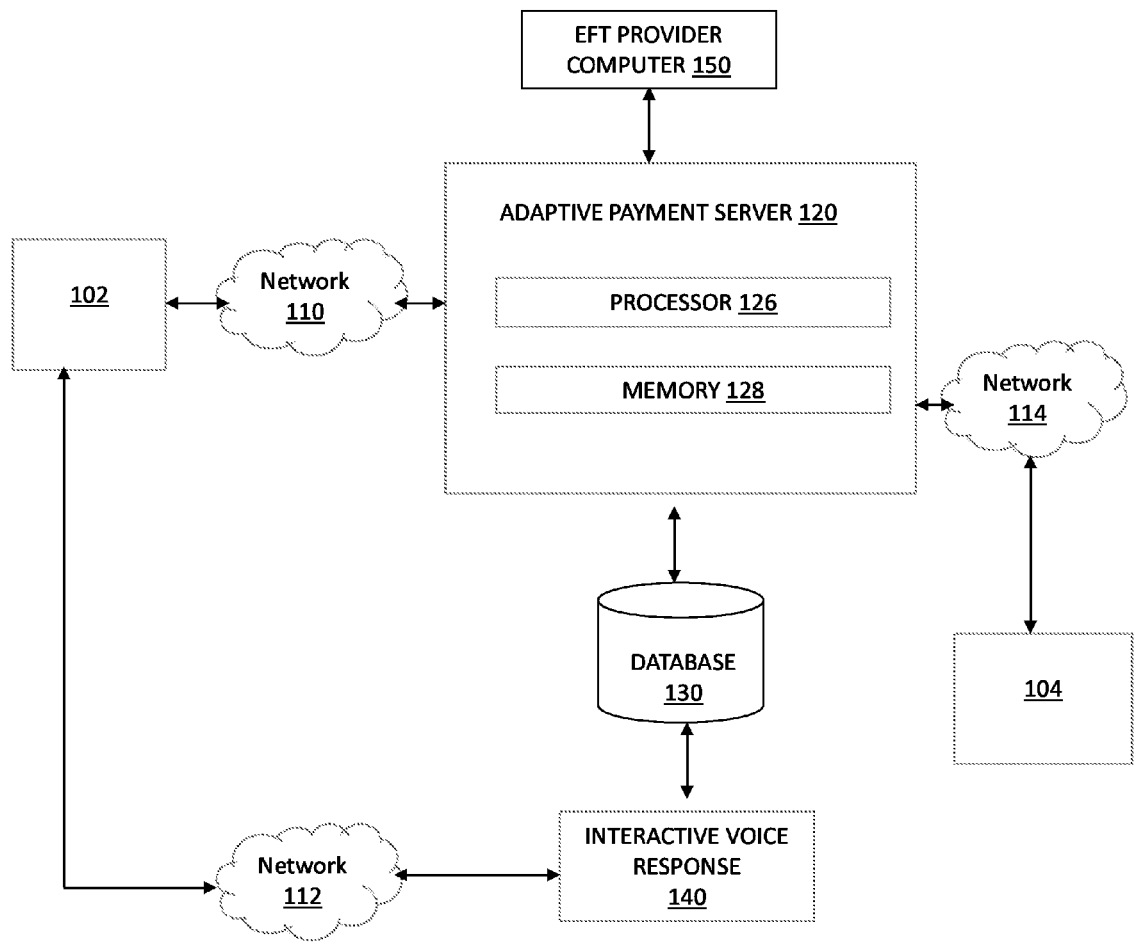
FIG. 1 is a block diagram illustrating an example of a system for processing person-to-person transactions according to various implementations of the invention.

FIG. 1 is a block diagram illustrating an example of a system 100 for processing person-to-person transactions according to various implementations of the invention. System 100 may include, for example, a sender communication device 102, a receiver communication device 104, a network 110, a network 112, a network 114, an adaptive payment server 120, a database 130, an IVR 140, and an EFT provider computer 150.

According to various implementations of the invention, adaptive payment server 120 may receive a request to initiate a person-to-person transaction (for example, a funds transfer between the sender and the receiver) from a sender via sender communication device 102. In some implementations, the request may include among other information items, first identification information associated with the sender, a transfer fund amount, an identifier associated with a receiver and/or receiver communication device 104 (for example, a name of the receiver, a telephone number of the receiver, email address of the receiver, and/or other identifier), and/or other information items. In some implementations, more or fewer information items may be included in the request.

According to various implementations of the invention, adaptive payment server 120 may receive the first identification information communicated from sender communication device 102 via network 110. Sender communication device 102 and the first identification information may be associated with the sender. The first identification information may include, among other things, a debit card number, a bank account number, and/or other identifier that identifies or that may be used to identify a financial account associated with the sender (i.e., sender account) used for the person-to-person transaction. In some implementations, the first identification information may further include a name of the cardholder (such as a name of the sender), a telephone number of the cardholder, a mailing address of the cardholder, expiration date, and/or other information related to the debit card, the cardholder, and/or the person-to-person transaction.

According to various implementations of the invention, the first identification information may identify a sender account. The sender account may include a bank account, a debit account, and/or other financial account configured to handle electronic banking functions. The sender account may be associated with a debit card (for example, sender's debit card), or other electronic payment card, and/or other device that may be used to conduct transactions with and/or through the sender account. According to various implementations of the invention, the debit card may include a magnetic strip, a smart chip, and/or other tangible media configured to store the first identification information and/or other information.

According to various implementations of the invention, sender communication device 102 may be communicably coupled to adaptive payment server 120 via network 110 such that adaptive payment server 120 may receive the first identification information from sender communication device 102 on the first communication channel. Network 110 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless communication network, or other network or combination of networks.

According to various implementations of the invention, examples of sender communication device 102 may include any one or more of the following computing/processing devices, for instance, a personal computer, portable computer, personal digital assistant (PDA), workstation, web-enabled mobile telephone, a smart phone, a tablet computing device, a WAP device, web-to-voice device, or other device. Sender communication device 102 may include a data (or Internet) function configured to communicate data via network 110. In this manner, a sender may use sender communication device 102 to communicate the first identification information. Those having skill in the art will appreciate that the invention described herein may work with various system configurations.

Figure 2:
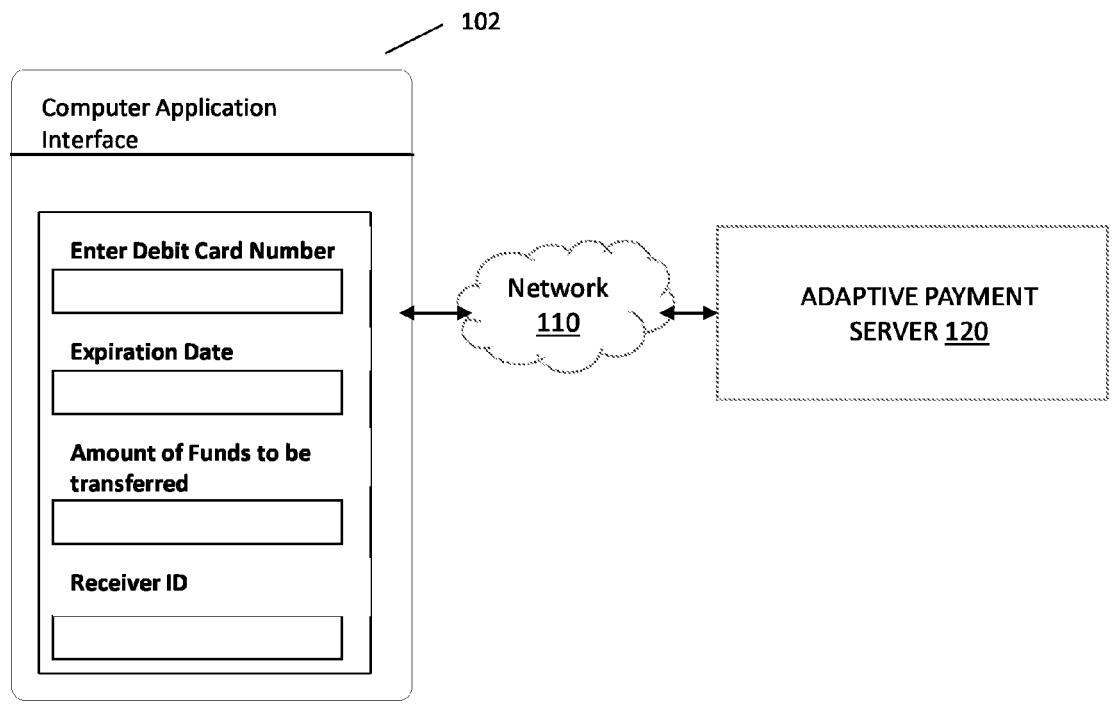
FIG. 2 is a block diagram illustrating an example of a system for processing a "card present" person-to-person transaction according to various implementations of the invention.

For example, a sender may use sender communication device 102 to provide the first identification information to adaptive payment server 120 to facilitate a payment to a receiver. In some implementations, sender communication device 102 may include a processor (not otherwise illustrated in the Figures), circuitry, and/or other hardware operable to execute computer-readable instructions and/or computer applications. In some implementations, sender communication device 102 may execute a computer application that is configured to generate a computer application interface and prompt the sender for the first identification information, a transfer fund amount, a receiver identifier, and/or other information via the computer application interface, as depicted in FIG. 2, for example. In other words, the sender may manually enter the first identification information and/or other information. The computer application may cause the communication of the first identification information to adaptive payment server 120 via network 110. In some implementations, sender communication device 102 may include a memory (not otherwise illustrated in the Figures) that includes one or more tangible (i.e., non-transitory) computer readable media. The memory may include one or more instructions that when executed by the processor configures the processor to perform functions of sender communication device 102/computer application.

Figure 3:
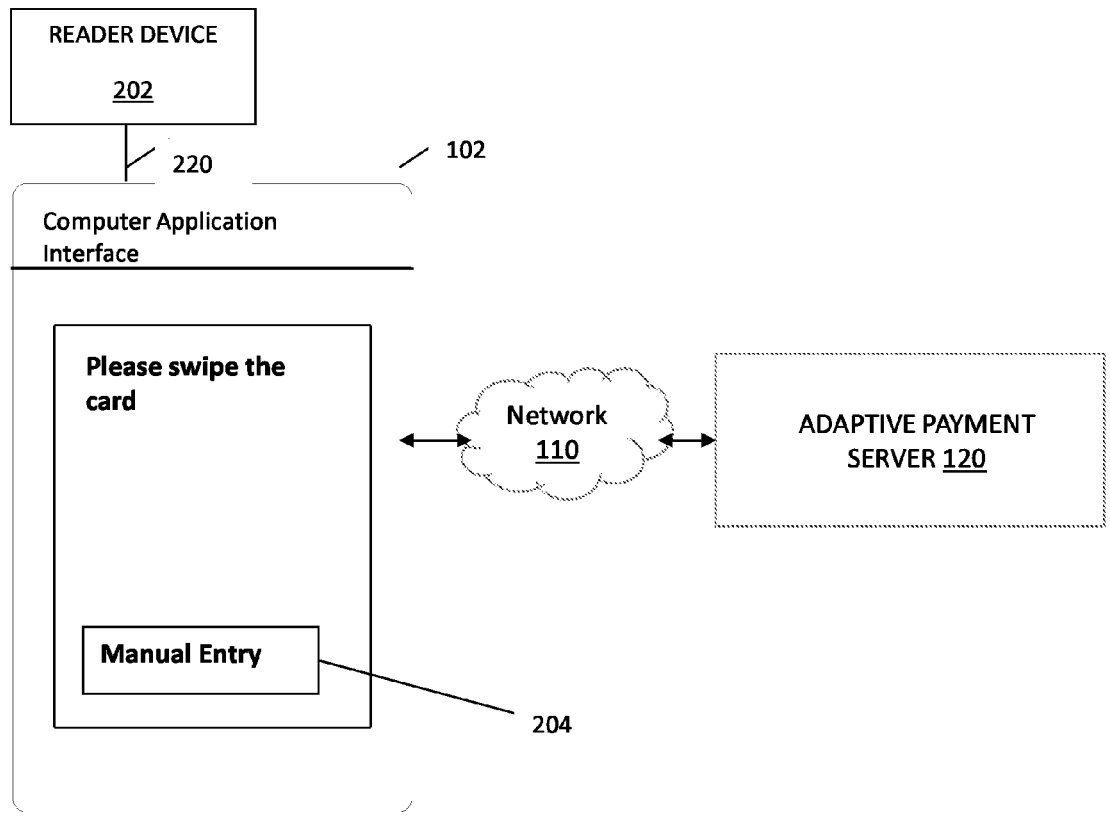
FIG. 3 is a block diagram illustrating an example of a system for processing a "card not present" person-to-person transaction according to various implementations of the invention.

In some implementations, the sender may use the sender communication device 102 (for example, a mobile device such as a smart phone or other portable computing device) to provide the first identification information via a reader device 202 (as depicted in FIG. 3, for example) removably attached to the sender communication device 102. In some implementations, the reader device 202 may read the first identification information from a sender's debit card (or other account transaction device) and provide the first identification information to the sender communication device 102 for transmission to the adaptive payment server 120.

In some implementations, the computer application may be configured to receive the first identification information associated with the sender via reader device 202 (for example, when a debit card is swiped or otherwise read using the reader device 202). In other words, the reader device 202 may read the first identification information associated with the sender's debit card and provide the first identification information to the computer application. In some implementations, the computer application may cause the first identification information to be communicated to adaptive payment server 120 via network 110.

In some implementations, the computer application may prompt the sender to swipe his/her debit card using the reader device 202. First identification information (e.g., a debit card number, expiration date, card security code, and/or other information) may be read by the reader device 202. The reader device 202 may provide the first identification information to the computer application. In some implementations, in response to a proper swipe, the computer application may cause a payment card swipe successful message to be displayed via a computer application interface of sender communication device 102. In some implementations, the sender may enter the payment card number, expiration date and/or card security code manually (if the card swipe was unsuccessful, for example) by selecting the manual entry option 204.

In some implementations, the computer application may receive the first identification information via the reader device 202 and may prompt the sender to manually enter the transfer fund amount, the receiver identifier, and/or other information via the computer application interface. The computer application may cause the communication of the information to adaptive payment server 120 via network 110.

In some implementations, reader device 202 and sender communication device 102 may be communicably coupled to one another via a bi-directional link 220, which can include a wired (such as via Universal Serial Bus, headphone/multi-function jack, or other wired link) or wireless link (such as BLUETOOTH or other wireless link). In some implementations, reader device 202 may be connected to or plugged in the sender communication device 102, wherein the reader device 202 may be configured to accept the sender's debit card associated with a user (e.g., sender) initiating/performing a payment-to-payment transaction. In some implementations, the reader device 202 may be plugged into a headphone/audio jack of the sender communication device 102. In some implementations, the reader may be implemented as software configured to cause the mobile device itself to read, for example, a smart chip of the sender's debit card via various wireless capabilities and functions of the mobile device.

In some implementations, adaptive payment server 120 may receive second identification information from/associated with the sender. In some implementations, using the first identification information, adaptive payment server 120 may identify sender communication device 102. For example, in some implementations, the first identification information may include a telephone number of sender communication device 102, thereby identifying sender communication device 102. According to various implementations of the invention, adaptive payment server 120 may query database 130 to identify sender communication device 102 based on the first identification information.

In some implementations, adaptive payment server 120 may use or otherwise interface with IVR 140 (Interactive Voice Response) in order to initiate a communication with sender communication device 102. IVR 140 may initiate a communication to sender communication device 102 via network 112. Once the communication is established, IVR 140 may prompt for and receive the second identification information from sender communication device 102. The second identification information may include, among other things, a predefined secret. The predefined secret may include, for example, a password, PIN, and/or other secret. In some implementations, the second identification information may be provided verbally or via soft and/or hard keys of the sender communication device 102. As such the first identification information and the second identification information (i.e., sender PIN) is associated with a sender and provided to the adaptive payment server 120 via sender communication device 102.

According to various implementations of the invention, upon receipt of the second identification information, IVR 140 may use or otherwise be interfaced with a security module (not otherwise illustrated in the Figures) to encrypt the second identification information. In some implementations, IVR 140 may store the second identification information and/or encrypted second identification information in database 130. In some implementations, the security module may apply Triple Data Encryption Algorithm (commonly, "Triple DES") to encrypt the second identification information. As would be appreciated by those having skill in the art, other encryption algorithms may be utilized.

In some implementations, IVR 140 may initiate a communication to sender communication device 102 via network 112 on a second communication channel discrete from the first communication channel. Once the communication is established, IVR 140 may prompt for and receive the second identification information from sender communication device 102.

In some implementations, adaptive payment server 120 may determine a sender account associated with the first identification information. According to various implementations of the invention, adaptive payment server 120 may query database 130 to identify the sender account based on the first identification information.

In some implementations, adaptive payment server 120 may authenticate identification of the sender account based on the second identification information. In other words, based on the received second identification information (e.g., PIN information), adaptive payment server 120 may ensure that the sender account belongs to the sender. In some implementations, adaptive payment server 120 may communicate with the sender's bank to verify that the second identification information is associated with the sender account. In some implementations, adaptive payment server 120 may query database 130 to retrieve the second identification information stored therein and compare the stored second identification information with the received second identification information. In other words, database 130 may have the second identification information stored therein (prior to receiving information from the sender via IVR 140) which may be compared to the second identification information received via IVR 140. In response to a match, adaptive payment server 120 may determine that the sender account belongs to the sender (i.e., identify the sender account as being authentic).

In some implementations, adaptive payment server 120 may determine whether the sender account has sufficient funds to cover the transfer fund amount (i.e., withdrawal/debit of the transfer fund amount). In response to a determination that sufficient funds exist, adaptive payment server 120 may communicate to the sender communication device 102 a confirmation message that includes a confirmation number. The confirmation message may indicate to the sender that the request to initiate the person-to-person transaction (i.e., funds transfer) has been received and has been approved. In some implementations, the confirmation message may indicate receipt of the first identification information and/or second identification information to sender communication device 102. In some implementations, the confirmation message may include the transfer fund amount associated with the person-to-person transaction. In some implementations, the computer application executed by communication device 102 may cause the confirmation message to be displayed via the computer application interface of the sender communication device 102.

In some implementations, adaptive payment server 120 may generate the confirmation number for the person-to-person transaction. The confirmation number may be one or more words, characters, numbers, and/or other identifiers that may identify the person-to-person transaction. Furthermore, the confirmation number may be written, typed, and/or spoken. In this manner, the confirmation number may be used to identify the person-to-person transaction to the sender, receiver and/or other entity. According to various implementations of the invention, the confirmation number may be stored using database 130 for later retrieval by adaptive payment server 120 and/or IVR 140.

For example, according to some implementations of the invention, adaptive payment server 120 may communicate the confirmation number to sender communication device 102, thereby allowing the sender or other entity using the sender communication device 102 to identify the person-to-person transaction in future communications. According to various implementations of the invention, the confirmation message may include the confirmation number. According to various implementations of the invention, the confirmation number may be stored using database 130 for later retrieval by adaptive payment server 120.

In some implementations, adaptive payment server 120 may communicate a notification indicative of an incoming funds transfer to receiver communication device 104 via network 114. In some implementations, adaptive payment server 120 may identify the receiver communication device 104 based on the receiver identifier received from the sender communication device 102. For example, the sender may provide a telephone number, an email address, or other receiver identifier associated with the receiver/receiver communication device 104. According to various implementations of the invention, adaptive payment server 120 may query database 130 (or perform lookup of database 130) to identify receiver communication device 104 based on the receiver identifier. The lookup may be a structured query language (SQL) query, lightweight directory access protocol (LDAP) query, and/or any other known methods of querying database 130.

In some implementations, the notification may include an SMS message to the receiver. In some implementations, adaptive payment server 120 may generate an SMS message including the confirmation number and may communicate the SMS message to the receiver communication device 104. In some implementations, other forms of communications may be used to provide to the receiver, such as, email message, voice message, and/or other forms of communications without departing from the scope of the invention.

In some implementations, adaptive payment server 120 may receive third identification information communicated from receiver communication device 104 via network 114. Receiver communication device 104 and the third identification information may be associated with the receiver. The third identification information may include, among other things, a debit card number, a bank account number, and/or other identifier that identifies a financial account associated with the receiver (i.e., receiver account) used for the person-to-person transaction. In some implementations, the third identification information may further include a name of the cardholder (such as a name of the receiver), a telephone number of the cardholder, a mailing address of the cardholder, expiration date, and/or other information related to the debit card, the cardholder, and/or the person-to-person transaction.

According to various implementations of the invention, the third identification information may identify a receiver account. The receiver account may include a bank account, a debit account, and/or other financial account configured to handle electronic banking functions. The receiver account may be associated with a debit card (for example, receiver's debit card), or other electronic payment card, and/or other device that may be used to conduct transactions with and/or through the receiver account. According to various implementations of the invention, the debit card may include a magnetic strip, a smart chip, and/or other tangible media configured to store the third identification information and/or other information.

According to various implementations of the invention, examples of receiver communication device 104 may include any one or more of the following computing/processing devices, for instance, a personal computer, portable computer, personal digital assistant (PDA), workstation, web-enabled mobile telephone, a smart phone, a tablet computing device, a WAP device, web-to-voice device, or other device. Receiver communication device 104 may include a data (or Internet) function configured to communicate data via network 114. In this manner, a receiver may use receiver communication device 104 to communicate the third identification information. Network 114 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless communication network, or other network or combination of networks. Those having skill in the art will appreciate that the invention described herein may work with various system configurations.

For example, a receiver may use receiver communication device 104 to provide the third identification information. In some implementations, receiver communication device 104 may include a processor (not otherwise illustrated in the Figures), circuitry, and/or other hardware operable to execute computer-readable instructions and/or computer applications. In some implementations, receiver communication device 104 may execute a computer application that is configured to generate a computer application interface and prompt the receiver for the third identification information, a confirmation number (for example, the confirmation number provided by the adaptive payment server 120 in the SMS message), and/or other information via the computer application interface, for example. In other words, the receiver may manually enter the third identification information and/or other information. The computer application may cause the communication of the entered information to adaptive payment server 120 via network 114. In some implementations, receiver communication device 104 may include a memory (not otherwise illustrated in the Figures) that includes one or more tangible (i.e., non-transitory) computer readable media. The memory may include one or more instructions that when executed by the processor configures the processor to perform functions of receiver communication device 104/computer application.

In some implementations, adaptive payment server 120 may compare the confirmation number received from the receiver communication device 104 with the confirmation number generated by the adaptive payment server 120. In response to a match, the adaptive payment server 120 may determine that the receiver is legitimate (i.e., is the person who is intended to receive the funds).

In some implementations, adaptive payment server 120 may determine a receiver account associated with the third identification information. According to various implementations of the invention, adaptive payment server 120 may query database 130 to identify the receiver account based on the third identification information.

In some implementations, adaptive payment server 120 may process the person-to-person transaction (i.e., funds transfer) by generating an EFT request to an EFT payment network. Upon processing the person-to-person transaction, adaptive payment server 120 may communicate a result (in the form of a receipt, for example) of the person-to-person transaction to sender communication device 102 and receiver communication device 104. In some implementations, adaptive payment server 120 may retrieve the confirmation number associated with the person-to-person transaction and include the confirmation number in the receipt. The receipt may indicate that the person-to-person transaction has been processed and that the transfer fund amount has been transferred from the sender account to the receiver account. In some implementations, the receipt may include various transaction data such as, without limitation, a name of the sender, name of the receiver, a transfer fund amount of the transaction, and/or other data. In some implementations, the respective computer applications may cause the receipt to be presented at the communication devices.

In some implementations of the invention, the person-to-person transaction may be processed via an EFT network. In these implementations, processing the person-to-person transaction may include generating a funds transfer request to an EFT provider (via EFT provider computer 150) such as, without limitation, SHAZAM, NYCE, PULSE, STAR, INTERLINK, and/or other entity that provides EFTs. In these implementations, adaptive payment server 120 may communicate an EFT request associated with the sender account and/or receiver based on the first identification information, the second identification information, and/or the third identification information. In some implementations of the invention, the EFT request may include, without limitation, an ISO 8583 payment message supported by various EFT networks. As would be appreciated, each network may adapt the ISO 8583 standard for its own use with custom fields and custom usages. As would be further appreciated, the placement of fields in different versions (such as 1987, 1993 and 2003) of the standard varies. In some implementations, one EFT network may act as a gateway to other EFT networks to provide universal coverage.

In some implementations, adaptive payment server 120 may cause the transfer fund amount to be transferred based on the EFT request. In some implementations of the invention, the EFT is processed by or otherwise fulfilled by an EFT provider (such as via EFT provider computer 150).

In some implementations of the invention, adaptive payment server 120 may receive an indication of transfer fund amount to be transferred from the sender account to the receiver account. In some implementations, adaptive payment server 120 may cause the transfer fund amount to be transferred from the sender account to the receiver account. Adaptive payment server 120 may do so by generating, for example, an EFT request that indicates the sender account, the receiver account, the sender PIN, and/or transfer fund amount to be transferred.

In some implementations, the EFT provider computer 150 may debit the transfer fund amount from the sender account. In some implementations, the EFT provider computer 150 may credit the transfer fund amount to the receiver account.

According to various implementations of the invention, database 130 may include, among other things, information related to a sender and receiver accounts, such as, for example, sender/receiver debit card numbers, sender/receiver contact information, expiration dates, sender/receiver information, an identity of sender communication device 102 used by the sender, an identity of receiver communication device 104 used by receiver, and/or other information. In some implementations, database 130 may store the first identification information, the second identification information, and/or the third identification information along with the account information. According to various implementations of the invention, examples of database 130 include, for instance, a relational database, a filesystem, and/or other device or data representation configured for data storage.

According to various implementations of the invention, adaptive payment server 120 may identify sender communication device 102 based on the received first identification information. For example, the first identification information may include a telephone number input by the sender. According to various implementations of the invention, adaptive payment server 120 may identify sender communication device 102 by performing a lookup of database 130.

According to various implementations of the invention, adaptive payment server 120 may receive a debit card number and query database 130 to determine a telephone number of the sender who owns a sender account identified by the received debit card number. The lookup may be a structured query language (SQL) query, lightweight directory access protocol (LDAP) query, and/or any other known methods of querying database 130. In this manner, by storing an identifier (such as the telephone number in the preceding example) that identifies sender communication device 102 and the first communication information (such as the debit card number in the preceding example), system 100 may be configured to initiate a communication to sender communication device 102 using the first identification information.

According to various implementations of the invention, adaptive payment server 120 may initiate a second communication to sender communication device 102 on the second communication channel in order to prompt for and receive the second identification information. For example, adaptive payment server 120 may initiate a telephone call to sender communication device 102.

According to various implementations of the invention, adaptive payment server 120 may initiate the telephone call via IVR 140. IVR 140 may include existing IVRs configured to initiate a telephone call a communication device that includes a telephone function (such as, for example, sender communication device 102), communicate information to a call recipient, interactively prompt the call recipient for input, receive the input (by touch-tone input, voice input, and/or other input mechanism), process the input, and/or perform other interactive voice functions.

According to various implementations of the invention, IVR 140 may initiate the second communication to sender communication device 102 on the second communication channel via network 112. Network 112 may be a Public Switch Telephone Network (PSTN), VOIP network, and/or other network or combination of networks that is configured for telephonic (voice) communication.

Although communication devices 102 and 104 in examples described herein are respectively described as including Internet, telephone, and SMS messaging functions, according to various implementations of the invention, communication devices 102 and 104 may include other combinations of communication functions without departing from the scope of the invention.

In some implementations, adaptive payment server 120 may include a processor 126, a memory 128, and/or other components that facilitate the functions of adaptive payment server 120. In some implementations, processor 126 includes one or more processors/hardware processors configured to perform various functions of adaptive payment server 120. In some implementations, memory 128 includes one or more tangible (i.e., non-transitory) computer readable media. Memory 128 may include one or more instructions that when executed by processor 126 configure processor 126 to perform functions of adaptive payment server 120. In some implementations, memory 128 may include one or more instructions stored on tangible computer readable media that when executed at a remote device, such as sender communication device 102 or receiver communication device 104, cause the remote device to perform various functions of the remote device described herein and to facilitate interaction with adaptive payment server 120, as described herein.

Figure 4:
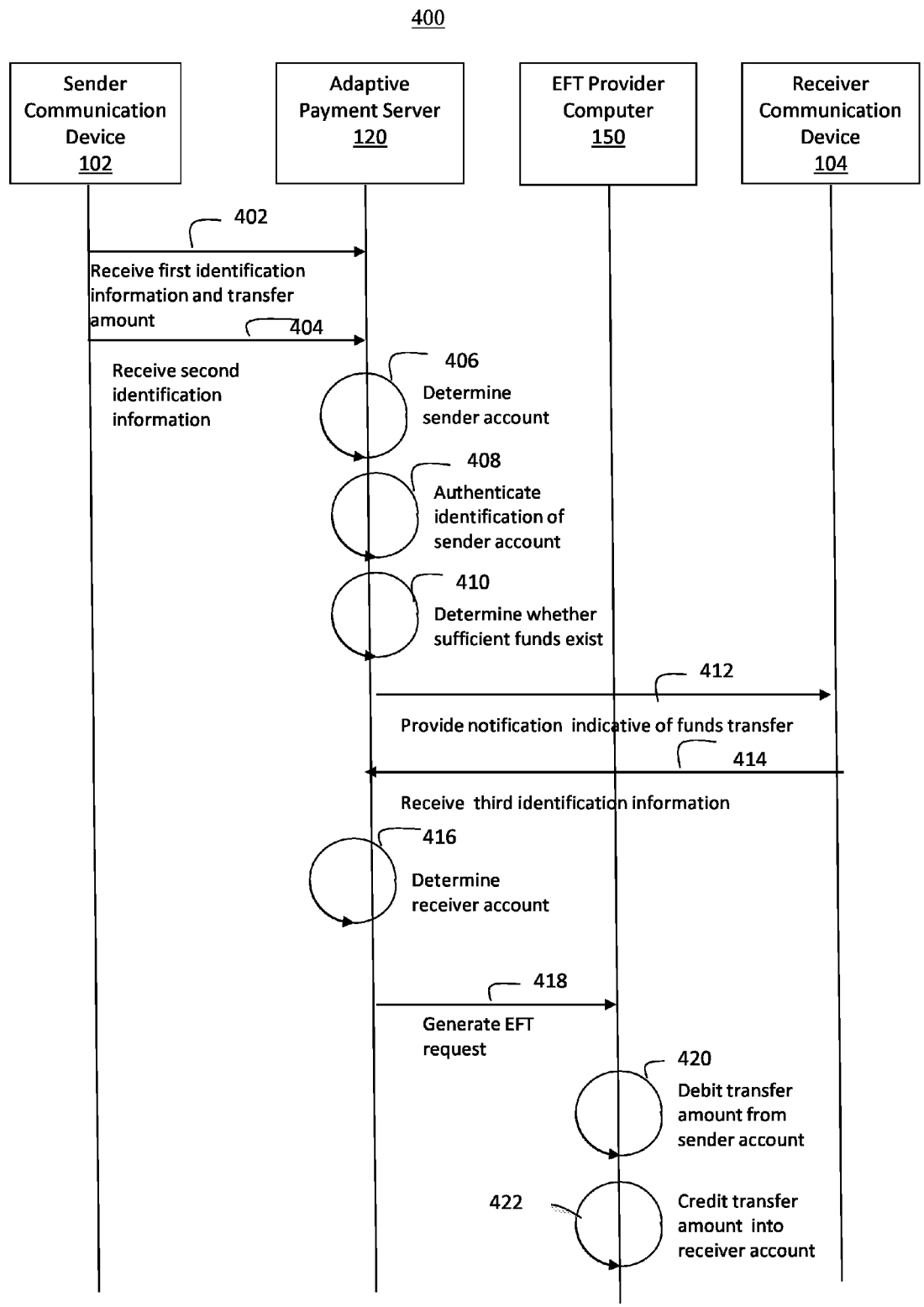
FIG. 4 is a diagram illustrating an example flow of data in an example system for processing a person-to-person transaction according to various implementations of the invention.

FIG. 4 is an example flow of data 400 in an example system for processing a person-to-person transaction according to various implementations of the invention. The data flow and/or process relationships shown in FIG. 4 and other flow diagrams described herein are non-limiting examples. As would be appreciated by those having skill in the art, other configurations and flows of data may be used.

According to various implementations of the invention, in an example operation, a sender may wish to transfer funds to a receiver. The sender may use sender communication device 102 to provide first identification information, transfer fund amount, receiver identifier, and/or other information to adaptive payment server 120. For example, in some implementations, the sender communication device 102 may include a smart phone with a removably coupled reader device 202. In these implementations, the reader device 202 may read the first identification information from a sender's debit card and provide the first identification information to the sender communication device 102 for transmission to the adaptive payment server 120.

In some implementations, the sender communication device 102 may include a personal computer device with Internet access. In these implementations, the sender may access a web-based service/portal to manually provide the first identification information, transfer fund amount, receiver identifier, and/or other information for transmission to the adaptive payment server 120. Other configurations may be used to provide first identification information as would be appreciated. In this manner, adaptive payment server 120 may receive first identification information, transfer fund amount, receiver identifier, and/or other information from sender communication device 102, in an operation 402.

In some implementations, adaptive payment server 120 may receive second identification information from sender communication device 102, in an operation 404. In some implementations, using the first identification information, adaptive payment server 120 may identify sender communication device 102. In some implementations, adaptive payment server 120 may use or otherwise interface with IVR 140 (Interactive Voice Response) in order to initiate a communication with sender communication device 102 and receive the second identification information from the sender communication device 102.

In some implementations, adaptive payment server 120 may determine a sender account associated with the first identification information, in an operation 406. According to various implementations of the invention, adaptive payment server 120 may query database 130 to identify the sender account based on the first identification information.

In some implementations, adaptive payment server 120 may authenticate identification of the sender account based on the second identification information, in an operation 408. In other words, based on the received second identification information (e.g., sender PIN information), adaptive payment server 120 may ensure that the sender account belongs to the sender. In some implementations, adaptive payment server 120 may communicate with the sender's bank to verify that the second identification information is associated with the sender account.

In some implementations, adaptive payment server 120 may determine whether the sender account has sufficient funds to cover the transfer fund amount (i.e., withdrawal/debit of the transfer fund amount), in an operation 410. In response to a determination that sufficient funds exist, adaptive payment server 120 may generate a confirmation number and communicate to the sender communication device 102 a confirmation message that includes the confirmation number. The confirmation message may indicate to the sender that the request to initiate the person-to-person transaction (i.e., funds transfer) has been received and has been approved.

In some implementations, adaptive payment server 120 may communicate a notification indicative of an incoming funds transfer to receiver communication device 104, in an operation 412. In some implementations, the notification may include an SMS message to the receiver. In some implementations, adaptive payment server 120 may generate an SMS message including the confirmation number and may communicate the SMS message to the receiver communication device 104.

In some implementations, adaptive payment server 120 may receive third identification information communicated from receiver communication device 104, in an operation 414. In some implementations, a receiver may use receiver communication device 104 to provide the third identification information, the confirmation number, and/or other information to adaptive payment server 120.

For example, in some implementations, the receiver communication device 104 may include a smart phone running a computer application. In these implementations, a receiver may manually provide the third identification information, confirmation number, and/or other information via an interface generated by the computer application for transmission to the adaptive payment server 120. In some implementations, the third identification information may be provided via a reader device (not otherwise illustrated in the figures) that reads the receiver's debit card.

In some implementations, the receiver communication device 104 may include a personal computer device with Internet access. In these implementations, the receiver may access a web-based service/portal to manually provide the third identification information, the confirmation number, and/or other information for transmission to the adaptive payment server 120. Other configurations may be used to provide third identification information as would be appreciated. In this manner, adaptive payment server 120 may receive third identification information, the confirmation number, and/or other information from receiver communication device 104, in an operation 414.

In some implementations, adaptive payment server 120 may determine a receiver account associated with the third identification information, in an operation 416. According to various implementations of the invention, adaptive payment server 120 may query database 130 to identify the receiver account based on the third identification information.

In some implementations, adaptive payment server 120 may process the person-to-person transaction (i.e., funds transfer) by generating an EFT request to an EFT payment network, in an operation 418. In some implementations of the invention, the person-to-person transaction may be processed via an EFT network in real time. In some implementations, adaptive payment server 120 may cause the transfer fund amount to be transferred based on the EFT request. In some implementations of the invention, the EFT is processed by or otherwise fulfilled by an EFT provider (such as via EFT provider computer 150). In some implementations, the EFT request includes an identifier identifying the sender account, an identifier identifying the receiver account, the sender PIN, and/or the transfer fund amount to be transferred.

In some implementations, the EFT provider computer 150 may debit the transfer fund amount from the sender account based on the EFT request, in an operation 420. In some implementations, the EFT provider computer 150 may credit the transfer fund amount to the receiver account based on the EFT request, in an operation 422.

In some implementations, adaptive payment server 120 may receive fourth identification information from receiver communication device 104. In some implementations, using the third identification information, adaptive payment server 120 may identify receiver communication device 104. In some implementations, adaptive payment server 120 may use or otherwise interface with IVR 140 in order to initiate a communication with receiver communication device 104. IVR 140 may initiate a communication to receiver communication device 104 via network 114. Once the communication is established, IVR 140 may prompt for and receive the fourth identification information from receiver communication device 102. The fourth identification information may include, among other things, a predefined secret. The predefined secret may include, for example, a password, PIN, and/or other secret. In some implementations, the second identification information may be provided verbally or via soft and/or hard keys of the receiver communication device 104. As such the third identification information and the fourth identification information (i.e., receiver PIN) is associated with a receiver and provided to the adaptive payment server 120 via receiver communication device 104.

In some implementations, adaptive payment server may authenticate identification of the receiver account based on the fourth identification information (in a manner similar to authenticating identification of sender account described above) prior to generating the EFT request.

Figure 5:
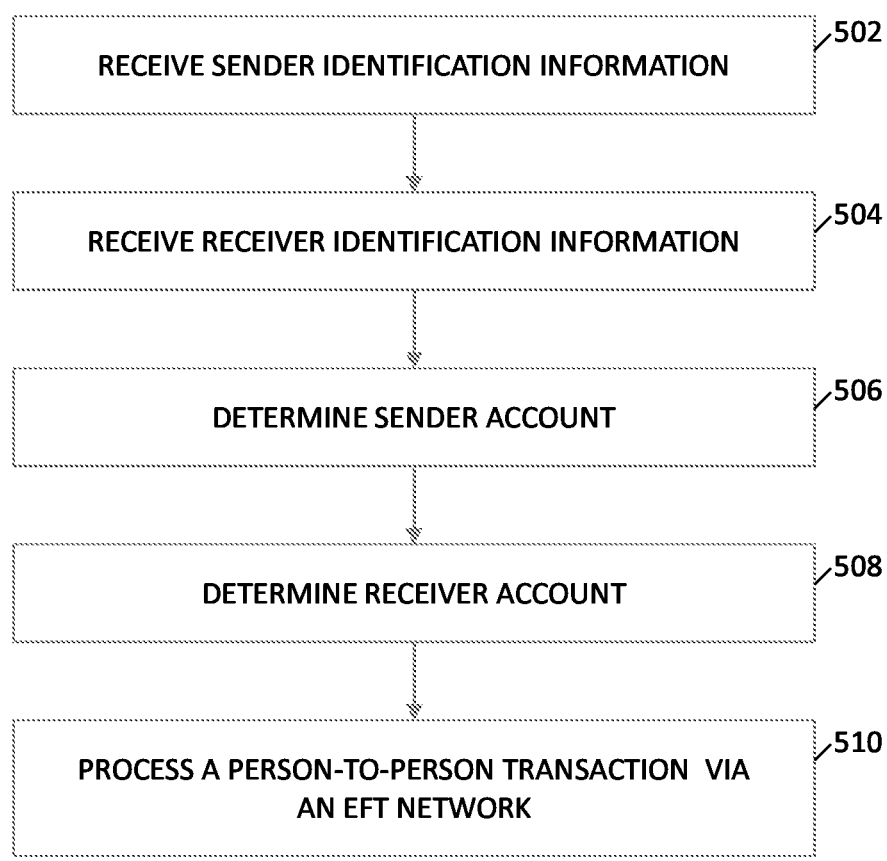
FIG. 5 is a flow diagram illustrating an example of a process of processing a person-to-person transaction according to various implementations of the invention.

FIG. 5 is a flow diagram illustrating an example process 500 of processing a person-to-person transaction according to various implementations of the invention. The various processing operations depicted in the flow diagram of FIG. 5 (and in the other drawing figures) are described in greater detail herein. The described operations for a flow diagram may be accomplished using some or all of the system components described in detail above and, in some implementations, various operations may be performed in different sequences. In some implementations, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

According to various implementations of the invention, in an operation 502, sender identification information (including for example, the first identification information and the second identification information) may be received from sender communication device 102. In some implementations, in an operation 504, receiver identification information (including for example, the third identification information and/or the fourth identification information) may be received from receiver communication device 104.

In some implementations, in an operation 506, a sender account may be determined based on the sender identification information. In some implementations, in an operation 508, a receiver account may be determined based on the receiver identification information.

In some implementations, in an operation 510, a person-to-person transaction (i.e., funds transfer) may be processed based on the sender account and the receiver account via an EFT network. In some implementations, the transaction may be processed by generating an EFT request to an EFT payment network. In some implementations, the EFT request may include an identifier identifying the sender account, identifier identifying the receiver account, a sender PIN and/or a transfer fund amount.

Implementations of the invention may be made in hardware, firmware, software, or any suitable combination thereof. Implementations of the invention may also be implemented as instructions stored on a machine-readable medium, which may be read and executed by one or more processors. A tangible non-transitory machine-readable medium may include any mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Intangible machine-readable transmission media may include intangible forms of propagated signals, such as carrier waves, infrared signals, digital signals, and other intangible transmission media. Further, firmware, software, routines, or instructions may be described in the above disclosure in terms of specific exemplary implementations of the invention, and performing certain actions. However, it will be apparent that such descriptions are merely for convenience and that such actions in fact result from computing devices, processors, controllers, or other devices executing the firmware, software, routines, or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A method of processing a person-to-person payment transaction via a sender communication device and a receiver communication device, comprising:

receiving, by an adaptive payment server and from the sender communication device via a first communication channel, a request to initiate the person-to-person payment transaction, the request comprising a debit card number identifying a sender account of the sender;

identifying, by the adaptive payment server, a second communication channel to the sender communication device based on the debit card number associated with the sender;

initiating, by the adaptive payment server and in response to the request to initiate the person-to-person payment transaction, a communication to the sender communication device via the second communication channel, where the second communication channel is different from the first communication channel;

prompting the sender, by the adaptive payment server and through the sender communication device via the second communication channel, to input a Personal Identification Number (PIN) for the sender account, wherein the PIN is sufficient to authenticate the sender account of the sender;

receiving, by the adaptive payment server, the PIN for the sender account from the sender communication device via the second communication channel;

receiving, by the adaptive payment server, a debit card number associated with a receiver from a receiver communication device;

determining, by the adaptive payment server, the sender account based on the debit card number associated with the sender;

authenticating the sender account with the PIN received from the sender through the second communication device via the second communication channel;

determining, by the adaptive payment server, a receiver account based on the debit card number associated with the receiver;

generating, by the adaptive payment server and in response to the authenticating the sender account, an electronic funds transfer (EFT) request, wherein the EFT request comprises the sender account, the receiver account, the PIN, and a transfer fund amount; and initiating, by the adaptive payment server, an EFT transaction by providing the EFT request to an EFT payment network to process the person-to-person payment transaction thereby causing the transfer fund amount to be transferred from the sender account and to the receiver account.

2. The method of claim 1, wherein the method further comprises determining whether the sender account has sufficient funds to cover the transfer fund amount.

3. The method of claim 1, further comprising:
communicating a notification indicative of an incoming funds transfer to the receiver communication device, wherein the notification comprises a confirmation number.

4. The method of claim 1,
wherein the transfer fund amount is debited from the sender account and credited to the receiver account in response to the EFT request.

5. The method of claim 1, wherein said initiating a communication further comprises:
determining a telephone number associated with the sender communication device based on the debit card number associated with the sender; and
calling, by an interactive voice response (IVR) system associated with the adaptive payment server, the sender communication device using the telephone number, wherein the sender communication device includes a telephone function.

6. A system of processing a person-to-person payment transaction via a sender communication device and a receiver communication device, comprising:
an adaptive payment server comprising one or more processors configured to:
receive, from the sender communication device via a first communication channel, a request to initiate the person-to-person payment transaction, the request comprising a debit card number identifying a sender account of the sender;
identify a second communication channel to the sender communication device based on the debit card number associated with the sender;
initiate, in response to the request to initiate the person-to-person payment transaction, a communication to the sender communication device via the second communication channel, where the second communication channel is different from the first communication channel;
prompt the sender, by the adaptive payment server and through the sender communication device via the second communication channel, to input a Personal Identification Number (PIN) for the sender account, wherein the PIN is sufficient to authenticate the sender account of the sender;
receive the PIN for the sender account from the sender communication device via the second communication channel;
receive a debit card number associated with a receiver from a receiver communication device;
determine the sender account based on the debit card number associated with the sender;
authenticate the sender account with the PIN received from the sender through the second communication device via the second communication channel;
determine a receiver account based on the debit card number associated with the receiver;
generate, in response to authenticating the sender account, an electronic funds transfer (EFT) request, wherein the EFT request comprises the sender account, the receiver account, the PIN, and a transfer fund amount; and
initiate an EFT transaction by providing the EFT request to an EFT payment network to process the person-to-person payment transaction thereby causing the transfer fund amount to be transferred from the sender account and to the receiver account.

7. The system of claim 6,
wherein the one or more processors are further configured to-determine whether the sender account has sufficient funds to cover the transfer fund amount.

8. The system of claim 6, wherein the one or more processors are further configured to:
communicate a notification indicative of an incoming funds transfer to the receiver communication device, wherein the notification comprises a confirmation number.

9. The system of claim 6, wherein
the transfer fund amount is debited from the sender account and credited to the receiver account in response to the EFT request.

10. The system of claim 6, wherein the one or more processors configured to initiate a communication are further configured to:
determine a telephone number associated with the sender communication device based on the debit card number associated with the sender; and
call, by an interactive voice response (IVR) system associated with the adaptive payment server, the sender communication device using the telephone number, wherein the sender communication device includes a telephone function.

11. A method of processing a person-to-person payment transaction via a sender mobile communication device and a receiver mobile communication device, comprising:
receiving, by an adaptive payment server and from the sender mobile communication device via a first communication channel, a request to initiate the person-to-person payment transaction, the request comprising a debit card number identifying a sender account of a sender, an identifier associated with a receiver, and a transfer fund amount;
identifying the sender mobile communication device using the debit card number of the sender account of the sender
initiating, by the adaptive payment server and in response to the request to initiate the person-to-person payment transaction, a communication to the identified sender mobile communication device via a second communication channel to prompt the sender to enter a Person Identification Number (PIN) for the sender account, wherein the PIN is sufficient to authenticate the sender account of the sender, where the second communication channel is different from the first communication channel;
receiving, by the adaptive payment server, the PIN via the second communication channel, the PIN entered by the sender in response to the prompt;
authenticating, by the adaptive payment server, the sender account with the PIN received via the second communication channel;
determining, by the adaptive payment server, whether the sender account has sufficient funds to cover the transfer fund amount;
communicating, by the adaptive payment server, a confirmation message to the sender mobile communication device, wherein the confirmation message indicates that the person-to-person payment transaction has been approved;

determining, by the adaptive payment server, a receiver mobile communication device and a receiver account based on the identifier associated with the receiver;

communicating, by the adaptive payment server, a notification to the receiver mobile communication device, wherein the notification notifies the receiver of an incoming person-to-person payment transaction;

generating, by the adaptive payment server and in response to the authenticating the sender account, an electronic funds transfer (EFT) request to initiate a funds transfer from the sender account to the receiver account, wherein the EFT request comprises the sender account, the receiver account, the PIN and the transfer fund amount; and sending the EFT request via an EFT payment network to process the person-to-person payment transaction thereby causing the transfer fund amount to be transferred from the sender account and to the receiver account.

* * * * *